United States Patent
Krishnamoorthy et al.

(10) Patent No.: US 7,161,757 B1
(45) Date of Patent: Jan. 9, 2007

(54) METHOD AND APPARATUS FOR CONTROLLING A DISK DRIVE UNDER A POWER LOSS CONDITION

(75) Inventors: Ravishanker Krishnamoorthy, Singapore (SG); Hin Sing Fong, Singapore (SG)

(73) Assignee: STMicroelectronics Asia Pacific (PTE) Ltd., Singapore (SG)

( * ) Notice: Subject to any disclaimer, the term of this patent is extended or adjusted under 35 U.S.C. 154(b) by 0 days.

(21) Appl. No.: 09/914,170

(22) PCT Filed: Feb. 25, 1999

(86) PCT No.: PCT/SG99/00013

§ 371 (c)(1),
(2), (4) Date: Dec. 5, 2001

(87) PCT Pub. No.: WO00/51118

PCT Pub. Date: Aug. 31, 2000

(51) Int. Cl.
*G11B 15/18* (2006.01)
(52) U.S. Cl. ..................................... 360/69
(58) Field of Classification Search .............. 360/69, 360/61, 70, 75, 73.03, 73.11, 73.14, 77.02, 360/77.03, 78.04, 78.13; 318/561
See application file for complete search history.

(56) References Cited

U.S. PATENT DOCUMENTS

| | | | |
|---|---|---|---|
| 4,371,903 A * | 2/1983 | Lewis | 360/75 |
| 4,679,102 A | 7/1987 | Wevers et al. | 360/75 |
| 4,786,995 A | 11/1988 | Stupeck et al. | 360/75 |
| 4,831,469 A * | 5/1989 | Hanson et al. | 360/75 |
| 4,866,554 A * | 9/1989 | Stupeck et al. | 360/256.3 |
| 5,473,238 A * | 12/1995 | Latham et al. | 318/560 |
| 5,495,156 A * | 2/1996 | Wilson et al. | 318/368 |
| 5,550,446 A * | 8/1996 | Schlager et al. | 318/439 |
| 5,872,670 A * | 2/1999 | Ataee | 360/69 |
| 6,094,022 A * | 7/2000 | Schillaci et al. | 318/254 |
| 6,140,784 A * | 10/2000 | Mazda | 318/280 |
| 6,282,049 B1 * | 8/2001 | Cameron et al. | 360/75 |
| 6,295,577 B1 * | 9/2001 | Anderson et al. | 711/113 |

FOREIGN PATENT DOCUMENTS

EP 0332058 A1 9/1989

* cited by examiner

*Primary Examiner*—Fred F. Tzeng
(74) *Attorney, Agent, or Firm*—Lisa K. Jorgenson; Timothy L. Boller; Seed IP Law Group PLLC

(57) ABSTRACT

A method for controlling a motorized data-storage device, including extracting energy from a spindle motor to drive a positioning motor of the data-storage device and other components, such as circuitry. In normal operation of one embodiment, a disk is rotated at a constant velocity by a spindle motor and a read/write head is moved over the disk surface by a voice-coil motor. In the event of a power failure, energy is extracted from the spindle motor to drive the voice-coil motor so the head can be safely moved away from the disk.

17 Claims, 4 Drawing Sheets

METHOD AND APPARATUS FOR CONTROLLING A DISK DRIVE UNDER A POWER LOSS CONDITION

This appl. is a 371 of PCT/SG99/00013 Feb. 25, 1999.

FIELD OF THE INVENTION

This invention relates to a control system and method which is applicable for use in data storage disk drives and the like particularly when a loss of supply power occurs during operation.

BACKGROUND

A typical data storage disk drive comprises at least one disk on which data is stored in magnetic or optical form, a head mounted on an arm to read/write from the disk surface and necessary control circuits. The disk is rotated at a constant velocity by a spindle motor and the arm is moved over the disk surface to access different locations on the disk surface by a voice coil motor (VCM). Upon power failure, in order to avoid physical damage to the disk storage surface as well as the read/write heads, the read/write head assembly should be positioned away from the disk data storage surface (referred to as parking the arm). Under power failure conditions the energy required to drive the voice coil motor may have to be derived from a secondary source, and in this case energy remaining in the spindle motor can be used by the disk drive circuits to operate the voice coil motor to park the arm.

SUMMARY OF THE INVENTION

In accordance with the present invention, there is provided a method for controlling a motorized mechanism in the event of external power loss, the motorized mechanism comprising first and second motors coupled to a common driving circuit, said first motor being arranged to rotate at a substantially constant rate with external electrical power applied to the driving circuit, wherein in the event of loss of said external electrical power to the driving circuit, the driving circuit is controlled so as to connect and disconnect the first and second motors to die driving circuit in substantially out-of-phase synchronism to enable said second motor to be driven with electrical power derived from back-emf of the rotating first motor.

Preferably, the motorized mechanism comprises a driving mechanism for a disk drive or the like, wherein the first motor is a spindle motor and the second motor is a read/write head positioning motor.

The present invention also provides a method for use in a disk drive having a spindle motor for rotating a data storage disk and a head positioning motor for positioning a read/write head, the spindle motor and positioning motor being coupled to be driven from an external power source by way of a driving circuit, the method being for controlling the motors in the event of loss of said external power source during rotation of the spindle motor wherein the spindle motor and positioning motor are switched on and off from the driving circuit substantially in out-of-phase synchronism to enable said positioning motor to be driven with electrical power derived from back-emf of the rotating spindle motor.

The present invention also provides a method for controlling a disk drive having a spindle motor and a positioning motor both coupled to a driving circuit, comprising the steps of:

detecting a loss of supply power to the driving circuit;

chopping connection between the spindle motor and the driving circuit to generate an intermittent back-emf derived recirculation current; and chopping connection between the positioning motor and driving circuit at least substantially synchronized out-of-phase with the chopping of the spindle motor connection to enable driving of the positioning motor using the recirculation current.

The present invention further provides a disk drive or the like having a spindle motor for rotatably driving a spindle and/or disk, a positioning motor for positioning a read and/or write head, and a motor driving circuit coupled to controllably drive the spindle motor and positioning motor under normal operation using an external power supply, the motor driving circuit including a controller adapted to respond to loss of said external power supply by chopping connection between the driving circuit and the spindle and positioning motors respectfully in a substantially synchronised out-of-phase manner to enable driving of the positioning motor with a recirculation current derived from a back-emf of the spindle motor.

In a preferred form of the invention, the driving circuit has upper and lower supply rails coupled to receive the external power supply under normal operation, and wherein the driving circuit includes a storage capacitor and a voltage clamp coupled to the upper supply rail.

Preferably the spindle motor is coupled to the upper and lower supply rails of the driving circuit by way of a plurality of respective upper and lower semiconductor switching elements having parallel diode elements, and wherein chopping of the spindle motor corresponds to alternately switching on and off the lower switching elements to connect the spindle motor to the lower supply rail, wherein switching off the lower switching elements allows back-emf derived from the spindle motor to generate a recirculation current through the upper switching elements to the upper supply rail.

Preferably the positioning motor is coupled to the upper and lower supply rails of the driving circuit by pairs of upper and lower semiconductor switching elements, and wherein chopping of the positioning motor corresponds to switching on and off a selected one of the pairs of switching elements to connect and disconnect the positioning motor to the upper and lower supply rails to selectively drive the positioning motor with said recirculating current.

BRIEF DESCRIPTION OF THE DRAWINGS

The invention is described in greater detail hereinbelow, by way of example only, through description of a preferred embodiment thereof and with reference to the accompanying drawings in which.

DETAILED DESCRIPTION OF PREFERRED EMBODIMENTS

A typical data storage disk drive, such as those known as hard disks, have one motor to drive a spindle for rotating the disk and another motor (sometimes called a voice coil motor or VCM) for positioning the read/write mechanism. When the disk drive is not in use it is desirable that the read/write head be positioned away from the data storage surface of the disk (to a parked position), to avoid contact between the head and disk surface which can cause damage. Thus, if a failure in the supply of electrical power to the disk drive occurs, it is desirable to move the read/write head to the parked position. The difficulty with achieving that aim lies in obtaining power with which to drive the voice coil motor for positioning the head mechanism.

One solution to the problem of obtaining the required electrical power for parking the head in a power supply failure is to provide the disk drive with a battery or capacitive power storage sufficient to power the VCM for the necessary operations. However, that solution can disadvantageously increase the construction costs of the disk drive. Another solution relies on the rotational energy stored in the spindle motor and the associated spindle and disk to which it is coupled. In that case, when the power supply fails the back emf (BEMF) of the spindle motor is harnessed to provide electrical power for operating the VCM. The maximum current that can be delivered by the BEMF in the spindle motor is limited by the motor parameters and the circuit elements. Further, the voltage supplied will drop to an unacceptably low voltage for the circuits to operate if the current required for the circuits is high.

Figure 1:
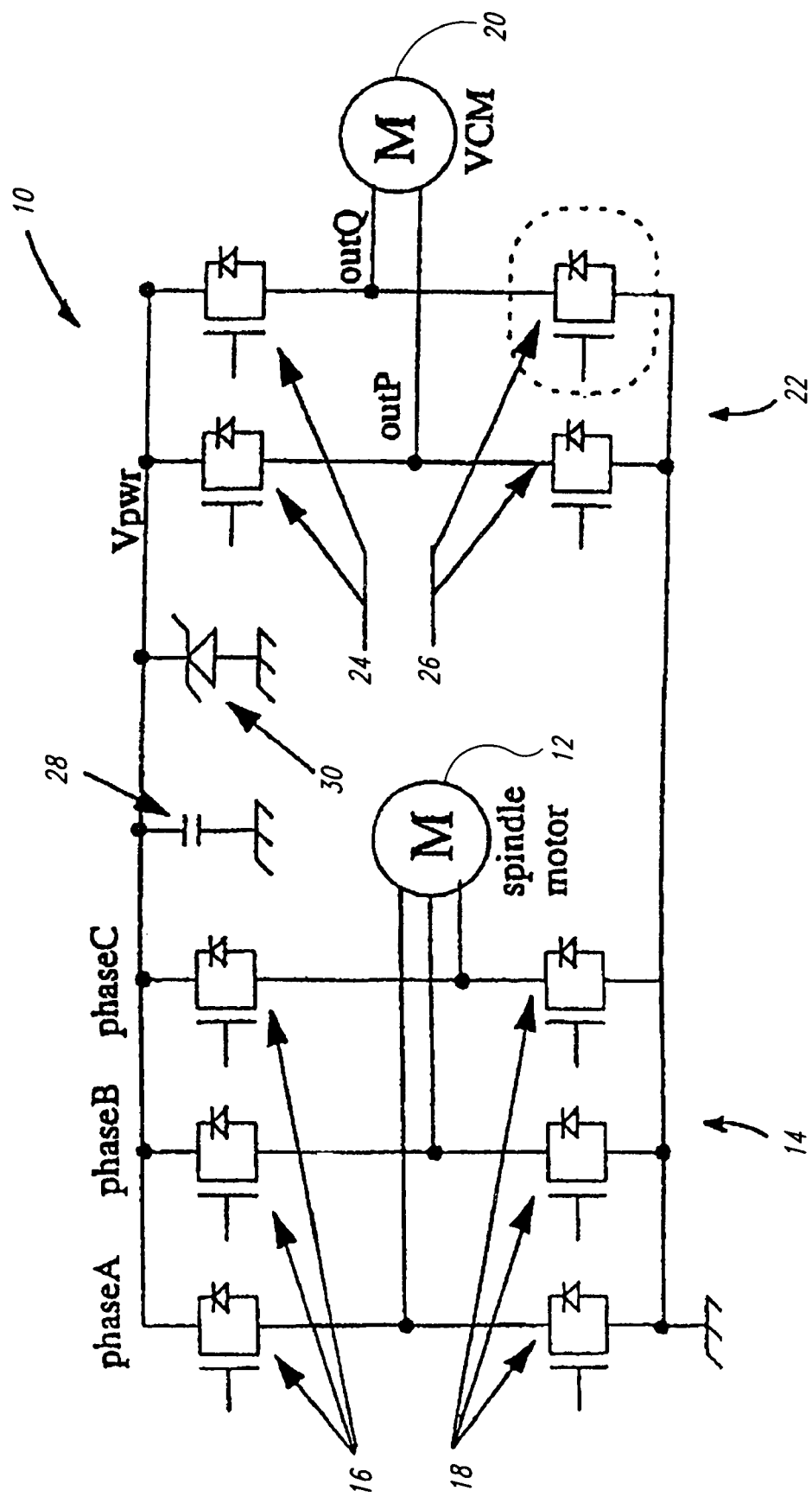
FIG. 1 is a circuit diagram of spindle motor and voice coil motor driving circuits under power loss condition.

A circuit diagram of a disk drive spindle and VCM motors and their driving circuits is shown at 10 in FIG. 1. The circuit 10 includes a spindle motor (12) which is coupled to be driven by a spindle driving circuit 14. The circuit 10 also includes a voice coil motor (VCM) 20 which is coupled to be driven by a VCM driving circuit 22. The spindle driving circuit 14 includes upper drivers 16 coupled between the spindle motor terminals and the upper power supply rail, and lower drivers 18 coupled between the spindle motor terminals and the lower power supply rail. The upper and lower spindle drivers 16, 18 are each arranged in three phases (phaseA, pbaseB and phaseC) for controlling the spindle motor, which is driven at a constant speed during operation. The upper and lower spindle drivers for each phase comprise an output power MOS switch with intrinsic body diode, and these switches are controlled, in use, by means of a pulse width modulation (PWM) controller or the like in known fashion. The controlling circuitry for the spindle motor and VCM driving circuits is omitted from the Figure in the interests of clarity.

The VCM driving circuit 22 also has upper drivers (24) and lower drivers (26) coupled between the VCM and upper and lower supply rails, respectively. The VCM driving circuit as shown includes two phases coupled to terminals of the VCM labelled outP and outQ, and each phase of the upper and lower VCM drivers comprises an output power MOS of similar construction to the spindle motor circuit.

Also coupled to the upper supply rail (labelled Vpwr) in circuit 10 is a storage capacitor 28 and a voltage clamp 30. The storage capacitor 28 is provided to enable transfer of BEMF energy from the spindle motor to the storage capacitor for powering the VCM. The boosted storage capacitor voltage is limited by the clamp circuit 30 to protect the other circuits from being damaged by a high voltage.

Figure 2:
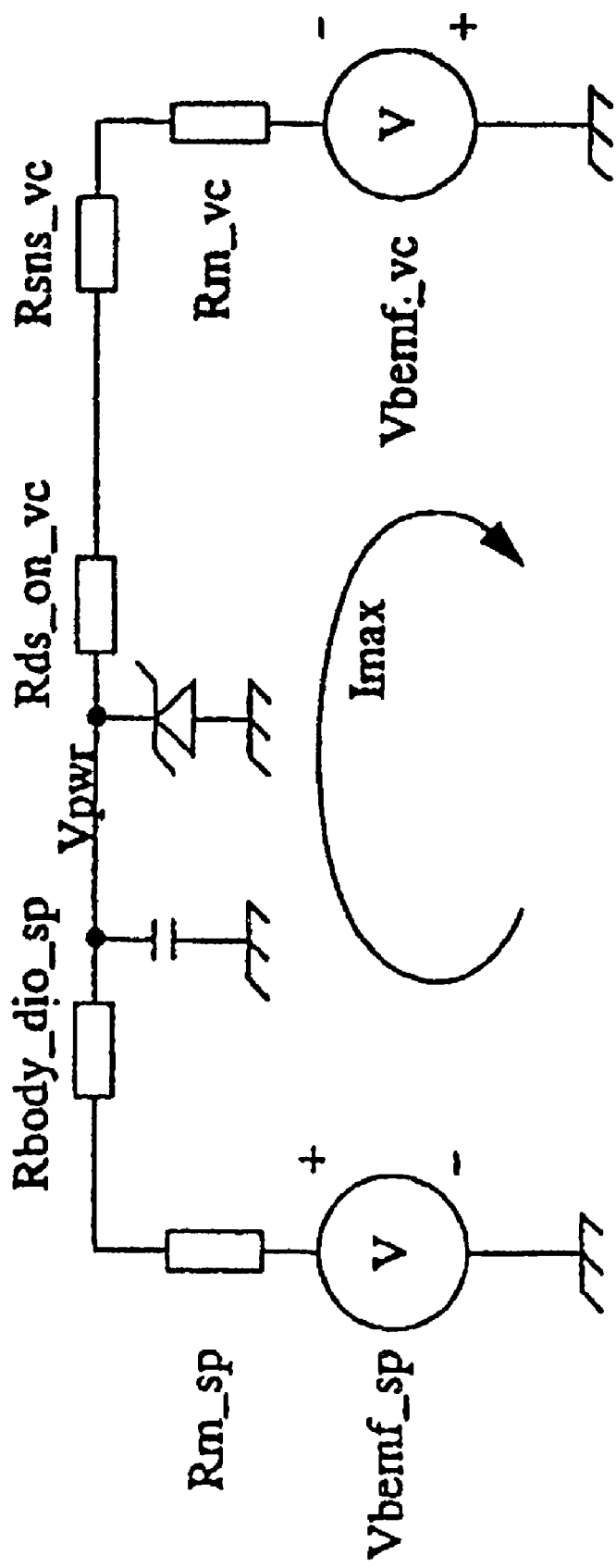
FIG. 2 is a simplified circuit diagram of the spindle and VCM circuits of FIG. 1.

A simplified circuit diagram of the spindle, VCM and respective driving circuits is shown in FIG. 2. The naming conventions for the elements of FIG. 2 is given below.

| | |
|---|---|
| Vbemf-sp | BEMF in the spindle motor. |
| Vbemf_vc | BEMF in the Voice Coil Motor (VCM). |
| Rm_sp | Spindle motor resistance. |
| Rm_vc | Voice Coil Motor resistance. |
| Rbody_dio_sp | Resistance of the body diodes of spindle driver MOS transistors. |
| Rds_on_vc | Total ON resistance of the VCM driver MOS transistors. |
| Rsns_vc | Sense resistor for the Voice Coil Motor. |
| Vpwr | Power supply voltage for the circuits. |

Writing a Kirchoff loop equation for the circuit as shown in FIG. 2 results in:

$$I_{max} = \frac{(V_{bemf\_sp} + V_{bemf\_vc})}{R_{m\_sp} + R_{body\_dio\_sp} + R_{ds\_on\_vc} + R_{sns\_vc} + R_{m\_vc}}$$

The corresponding voltage at Vpwr will be:

$$V_{pwr} = V_{bemf\_sp} - I_{max} \cdot (R_{m\_sp} + R_{body\_dio\_sp})$$

From the above equation it is clear that for a higher value of Imax, the Vpwr voltage will necessarily be lower. In order to overcome that limitation and obtain a suitable solution to the difficulties described above, three potential strategies arise, as summarised below.

1. Drive the VCM with the maximum possible current until Vpwr drops below a critical voltage for the circuits to operate, e.g. 3 V. However, this mode of operation places constraints on the design and reusage of the circuits that are operational under 12 V.
2. Use a very large storage capacitor 28 at Vpwr to supply the entire energy for the circuits to operate under no power condition. The energy is stored in the capacitor when supply power is available. This increases the solution cost.
3. Step up the voltage available at Vpwr by chopping of the spindle motor back emf.

Consider strategy 3, to step up the Vpwer voltage by chopping the spindle motor BEMF. Conventional methods develop a current in the spindle motor by shorting the terminals of the motor, which is equivalent to applying the spindle BEMF voltage across the motor resistance. When the short is released, the motor current recirculates through the body diodes of the output drive MOS transistors 16, 18. The recirculation current is dumped into the storage capacitor at the power supply Vpwr, boosting the voltage. This process of shorting and releasing is repeated at regular intervals to replenish charge in the storage capacitor. The circuits are protected from being damaged by a high voltage using the voltage clamp 30, which dissipates the excess energy from recirculation. This solution requires a smaller capacitor than strategy 2, but is still subject to three limitations as follows.

a. The size of the storage capacitor must increase as the peak current required by the load circuits increases. This increases the cost of the solution.
b. The efficiency of use of the spindle motor energy is low, since the energy dissipated in the clamp is unused.
c. The clamp circuit must be able to sustain the power dissipated within itself without getting damaged by the heat generated.

In order to reduce or overcome these drawbacks for an improved solution, a preferred embodiment of the present invention provides that the VCM is also driven in a chopped manner and that the OFF time of spindle chopping is synchronized with the ON time of the VCM. In other words, the VCM is turned ON when the spindle starts to recirculate, such that the recirculation energy is directly transferred to the VCM. A key advantage to that arrangement is that, by controlling the amount of current developed in the spindle in excess of the current required by the load, the amount of energy dumped into the capacitor and the clamp is controlled.

Figure 3:
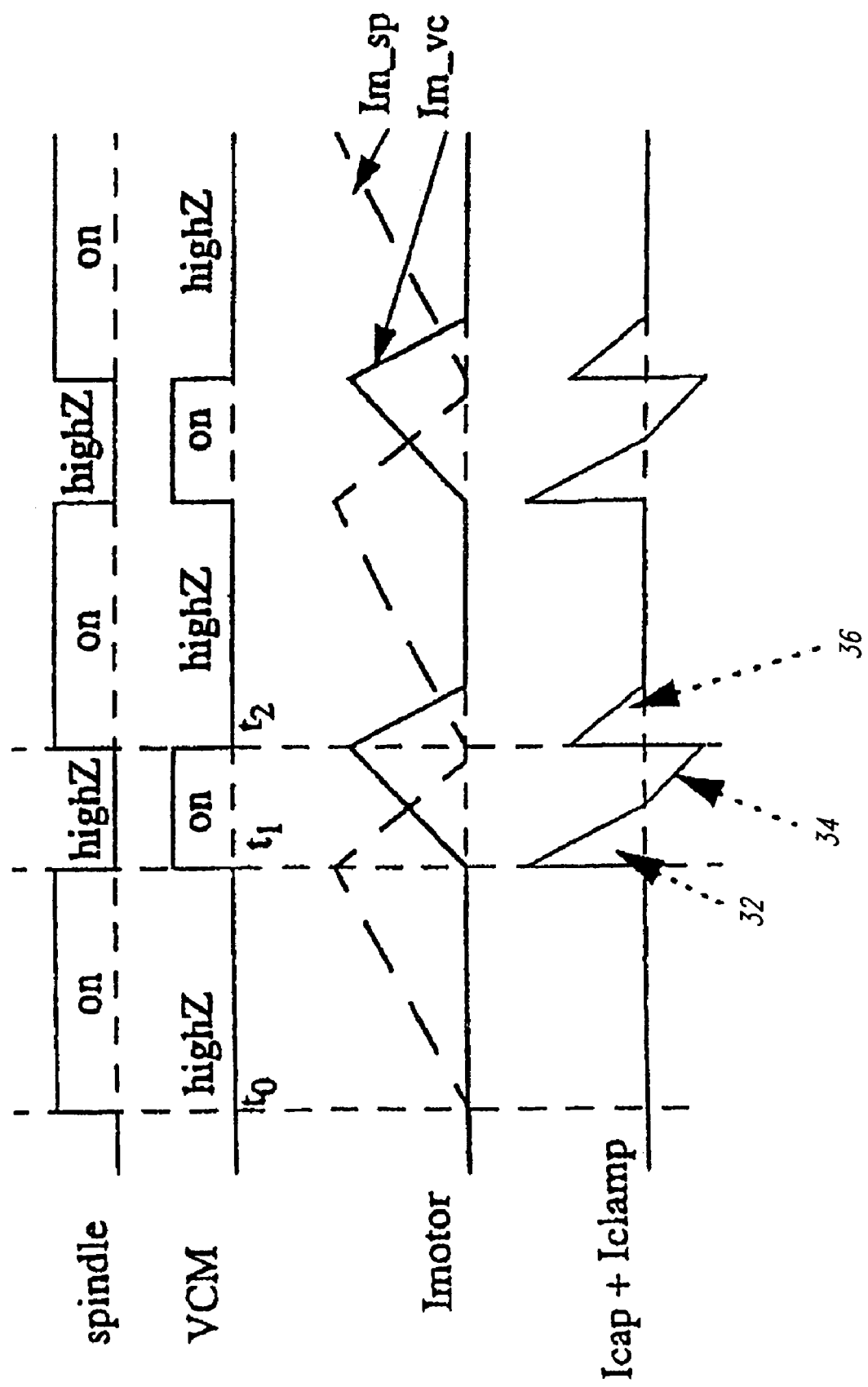
FIG. 3 is a waveform timing diagram for voltages and currents in the spindle and VCM circuits when controlled according to a preferred embodiment of the present invention.

A waveform diagram of the synchronized chopping of the spindle motor and the VCM is shown in FIG. 3. The first trace named spindle indicates the state of the spindle motor output drivers. Where the spindle trace shows "on" this indicates that the lower drivers 18 are turned on, resulting in build-up of the spindle motor current. The variation of the spindle motor current is indicated by the waveform labelled Im_sp in the trace labelled Imotor. Where the spindle trace shows "highZ" (meaning high impedance) this indicates that the output drivers are off which results in recirculation of the spindle motor current through the body diodes of the spindle output driver MOS transistors (16, 18). The second trace in FIG. 3, labelled VCM shows the state of the VCM output drivers 24, 26. Where the VCM trace shows "on" this indicates one of the following two states. First, current is flowing from node outP to node outQ (see FIG. 1) when the upper driver of outP and lower driver of outQ are turned on. Second, current is flowing from node outQ to node outP (see FIG. 1) when the upper driver of outQ and lower driver of outP are turned on. The corresponding current waveform in the VCM is indicated at Im_vc in the Imotor trace in FIG. 3. The fourth trace in FIG. 3, labelled as Icap+Iclamp shows the current in the storage capacitor 28 and voltage clamp 30 at the power supply rail Vpwr.

In the Icap+Iclamp trace, the waveform portion indicated at 32 corresponds to recirculation current delivered by the spindle motor. The next succeeding waveform portion indicated at 34 corresponds to current supplied to drive the VCM by the storage capacitor 28. Finally, the waveform portion indicated at 36 in the Icap+Iclamp trace corresponds to recirculation current of the voice coil motor itself. From this graph it becomes apparent that the proposed system of controlling the spindle and VCM drivers in these circumstances is advantageous, since most of the current generated from the spindle motor recirculation is directly used to drive the VCM. In order to achieve the most beneficial results, the time intervals indicated in FIG. 3 by $t_0$, $t_1$ and $t_2$, are chosen such that, 1. The average of Icap+Iclamp is positive, resulting in boosting up of the supply voltage.
2. This positive value of the average of Icap+Iclamp is kept at a minimum to reduce the power dissipated in the clamp.
3. The region where Icap+Iclamp is negative (capacitor supplying the VCM current) is minimum, which means that the required capacitor is smaller.

The optimum values for the time intervals will of course depend upon the actual circuit and motors upon which the system is implemented, but based upon the foregoing description suitable values for a given circuit may be easily determined experimentally.

Embodiments of the present invention may be implemented in existing forms of disk drives, for example, by operating with the standard driving circuitry and motors perhaps with the addition of a storage capacitor (28) and voltage clamp (30) where necessary. In that case, the control procedures of the preferred embodiment may be incorporated into the embedded control instructions of the disk drive or disk drive control circuitry as required. It is implicit in the foregoing description that the disk drive or the like includes means for early detection of the power supply failure, so that the procedures of the present invention may be put into action at the appropriate time.

Figure 4:
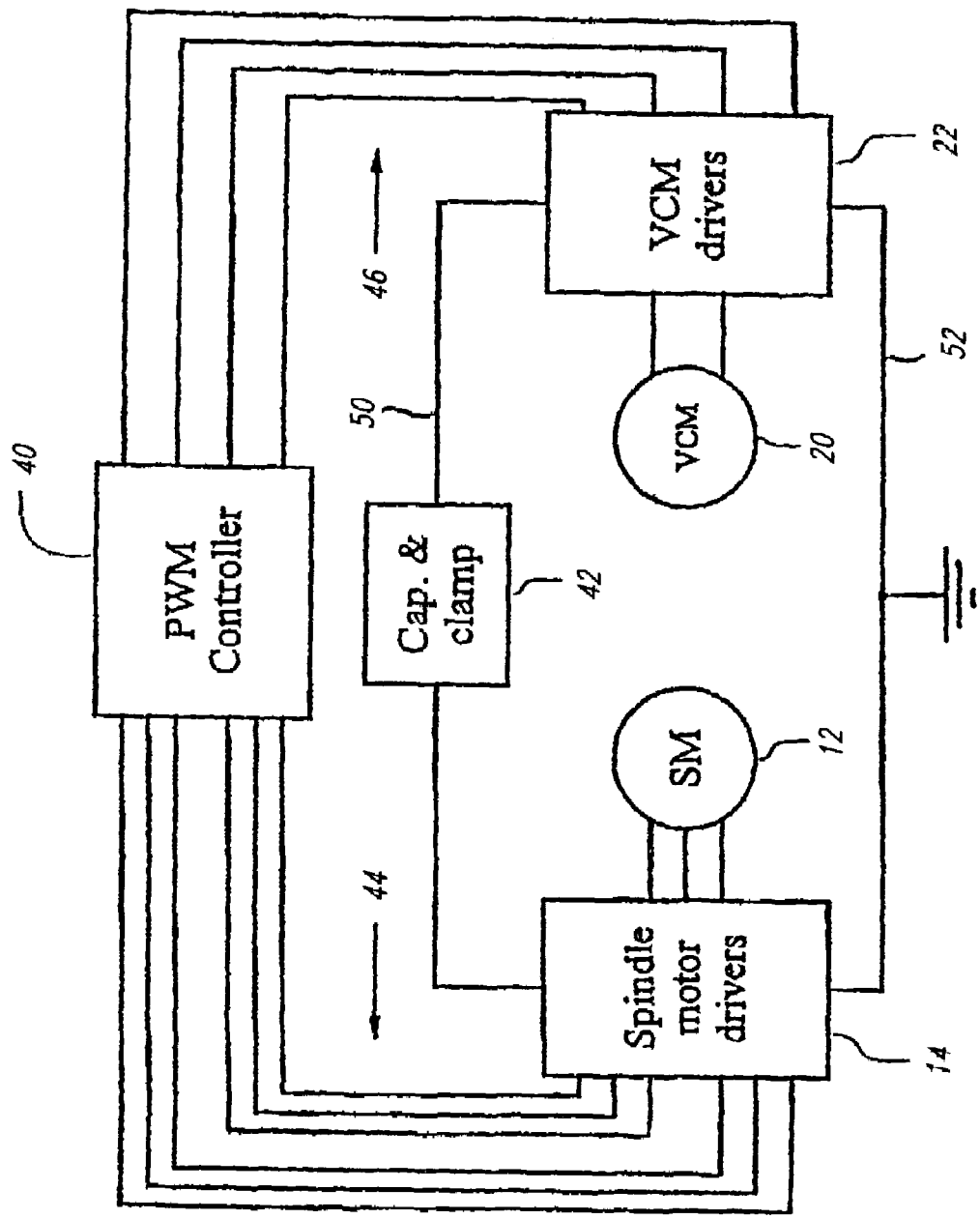
FIG. 4 is a block diagram representation of a circuit according to an embodiment of the invention.

In FIG. 4 a block diagram representation of a circuit according to an embodiment of the present invention is illustrated. In this diagram the spindle motor 12 is shown coupled to the spindle motor drivers 14, and the voice coil motor 20 is coupled to the VCM drivers 22, as in FIG. 1. The motor drivers 14, 22 are connected to upper and lower supply rails 50, 52 respectively, and a storage capacitor and clamp circuit 42 is coupled to the upper supply rail 50. The semiconductor switching elements (16, 18 in FIG. 1) of the spindle motor drivers 14 are selectively controllable to couple the terminals of the spindle motor to the upper and lower supply rails, and are controlled by way of control lines 44 which are coupled to a pulse width modulation (PWM) controller 40. Similarly, the semiconductor switching elements (24, 26 in FIG. 1) of the VCM drivers 22 are selectively controllable to couple the terminals of the VCM to the upper and lower supply rails, and are controlled by way of control lines 46 which are also coupled to the PWM controller 40. The PWM controller may itself be controlled by an external microcontroller or microprocessor to generate appropriate control signals on the control lines 44, 46, as is known in the art.

During normal operation (i.e. whilst external power is applied to the supply rails 50, 52) the PWM controller applies control voltages to the control lines 44, 46 so as to switch the drivers 14 to drive the spindle motor 12 at a substantially constant speed whilst the disk drive is in use. The PWM controller, during normal operation, may also selectively apply control voltages to the control lines 46 to switch the VCM driver 22 for selectively driving the VCM to position the read/write head as required to store or retrieve data. Then, when a loss of power to the supply rails is detected, the PWM controller operates in a different mode. In accordance with the preferred form of the invention, upon detection of the external power supply the PWM controller applies control voltages to the control lines 44 and 46 so as to switch the spindle motor and VCM drivers as described hereinabove to generate and store back-emf derived electrical power. In particular, the spindle motor drivers and VCM drivers are controlled by the PWM controller to chop the connections to the supply rails in an out-of-phase manner so that recirculation current generated by the spindle motor can be used directly by the VCM. The electrical power derived from the back-emf of the spinning spindle motor is thus used to drive the VCM and the PWM controller (and any other necessary circuitry) in order to park the read/write head.

The foregoing detailed description of the present invention is presented by way of example only, and is not intended to be considered limiting to the present invention as defined in the appended claims.

The invention claimed is:

1. A method for controlling a motorized mechanism in the event of external power loss, the motorized mechanism comprising first and second motors coupled to a common driving circuit, said first motor being arranged to rotate at a substantially constant rate with external electrical power applied to the driving circuit, the method comprising:

in the event of loss of said external electrical power to the driving circuit, controlling the driving circuit so as to repeatedly connect and disconnect the first and second motors to the driving circuit in substantially out-of-phase synchronism; and driving the second motor with electrical power derived from back-emf of the rotating first motor.

2. A method as claimed in claim 1, wherein the motorized mechanism comprises a driving mechanism for a data storage device, wherein the first motor is a spindle motor and the second motor is a read/write head positioning motor.

3. The method of claim 2 wherein the motorized mechanism further comprises a storage capacitor and a voltage clamp coupled to a power rail and the driving circuit is controlled such that an average current conducted through the storage capacitor and the voltage clamp is positive.

4. In a disk drive having a spindle motor for rotating a data storage disk and a head positioning motor for positioning a read/write head, the spindle motor and positioning motor being coupled to be driven from an external power source by way of a driving circuit, a method for controlling the motors in the event of loss of said external power source during rotation of the spindle motor, the method comprising:

repeatedly switching on and off the spindle motor and positioning motor from the driving circuit substantially in out-of-phase synchronism; and driving the positioning motor with electrical power derived from back-emf of the rotating spindle motor.

5. A method as claimed in claim 4, wherein the spindle motor is coupled to an upper and a lower supply rail of the driving circuit by way of a plurality of respective upper and lower semiconductor switching elements having parallel diode elements, and wherein switching on of the spindle motor corresponds to switching of the lower switching elements to connect the spindle motor to the lower supply rail, and switching off of the spindle motor allows back-emf derived from the spindle motor to generate a recirculating current through the upper switching elements to the upper supply rail.

6. A method as claimed in claim 5, wherein the positioning motor is coupled to the upper and lower supply rails of the driving circuit by pairs of upper and lower semiconductor switching elements, and wherein switching on of the positioning motor corresponds to switching on a selected one of the pairs of switching elements to connect the positioning motor to the upper and lower supply rails to drive the positioning motor with said recirculating current.

7. The method of claim 4 wherein the disk drive further comprises a storage capacitor and a voltage clamp coupled to a power rail and the driving circuit is controlled such that an average current conducted through the storage capacitor and the voltage clamp is positive.

8. A method for controlling a disk drive having a spindle motor and a positioning motor both coupled to a driving circuit, comprising the steps of:

detecting a loss of supply power to the driving circuit;

repeatedly chopping a connection between the spindle motor and the driving circuit to generate an intermittent back-emf derived recirculation current;

repeatedly chopping a connection between the positioning motor and driving circuit at least substantially synchronized out-of-phase with the chopping of the spindle motor connection to enable driving of the positioning motor using the recirculation current; and maintaining an average positive current through a storage capacitor and clamp circuit.

9. A data storage device comprising:

a spindle motor for rotatably driving a spindle and/or, disk;

a positioning motor for positioning a read and/or write head;

a motor driving circuit coupled to controllably drive the spindle motor and positioning motor under normal operation using an external power supply, the motor driving circuit including a controller adapted to respond to loss of said external power supply by repeatedly chopping connections between the driving circuit and the spindle and positioning motors respectfully in a substantially synchronized out-of-phase manner to enable driving of the positioning motor with a recirculation current derived from a back-emf of the spindle motor; and a storage capacitor and voltage clamp coupled to the driving circuit, wherein the controller is configured to maintain an average positive current through the storage capacitor and voltage clamp when driving the positioning motor with the recirculation current is enabled.

10. A data storage device comprising:

a spindle motor for rotatably driving a spindle and/or disk;

a positioning motor for positioning a read and/or write head;

and a motor driving circuit coupled to controllably drive the spindle motor and positioning motor under normal operation using an external power supply, the motor driving circuit including a controller adapted to respond to loss of said external power supply by chopping connection between the driving circuit and the spindle and positioning motors respectfully in a substantially synchronized out-of-phase manner to enable driving of the positioning motor with a recirculation current derived from a back-emf of the spindle motor wherein the driving circuit has an upper and a lower supply rail coupled to receive the external power supply under normal operation, and includes a storage capacitor and a voltage clamp coupled to the upper supply rail.

11. The data storage device of claim 10, wherein the spindle motor is coupled to the upper and lower supply rails of the driving circuit by way of a plurality of respective upper and lower semiconductor switching elements having parallel diode elements, and wherein chopping of the spindle motor corresponds to alternately switching on and off the lower switching elements to connect the spindle motor to the lower supply rail, wherein switching off the lower switching elements allows back-emf derived from the spindle motor to generate a recirculation current through the upper switching elements to the upper supply rail.

12. The data storage device of claim 10, wherein the positioning motor is coupled to the upper and lower supply rails of the driving circuit by pairs of upper and lower semiconductor switching elements, and wherein chopping of the positioning motor corresponds to switching on and off a selected one of the pairs of switching elements to connect and disconnect the positioning motor to the upper and lower supply rails to selectively drive the positioning motor with said recirculating current.

13. A motorized mechanism comprising:

a first motor;

a second motor;

a terminal for receiving external power; and a controller coupled to the first motor, the second motor and the terminal for receiving external power and comprising a power rail, wherein the controller is configured in a first mode of operation to generate control signals to operate the first motor at a substantially constant speed and in a second mode of operation to extract power from the first motor for operating the second motor by generating control signals to repeatedly connect and disconnect the power rail from the first and second motors substantially in out-of-phase synchronization.

14. The motorized mechanism of claim 13 wherein the motorized mechanism is a data storage device further comprising a spindle and the first motor drives the spindle.

15. The motorized mechanism of claim 14 further comprising a storage capacitor and a voltage clamp coupled to the power rail.

16. A motorized data storage device comprising:
a first motor;
a second motor;
a terminal for receiving external power;
a controller coupled to the first motor, the second motor and the terminal for receiving external power and comprising a power rail, wherein the controller is configured in a first mode of operation to generate control signals to operate the first motor at a substantially constant speed and in a second mode of operation to extract power from the first motor for operating the second motor by generating control signals to cyclically chop connections between the power rail and the first and second motors substantially in out-of-phase synchronization;
a spindle, wherein the first motor drives the spindle; and
a storage capacitor and a voltage clamp coupled to the power rail.

17. The motorized data storage device of claim 16 wherein the controller is configured to generate the control signals in the second mode of operation such that an average current conducted through the storage capacitor and the voltage clamp is positive.

* * * * *